United States Patent [19]
Hosogoe et al.

[11] Patent Number: 4,581,609
[45] Date of Patent: Apr. 8, 1986

[54] X-Y POSITION INPUT DEVICE FOR DISPLAY SYSTEM

[75] Inventors: Junichi Hosogoe; Motoyuki Suzuki; Yuichi Ida, all of Miyagi, Japan

[73] Assignee: Alps Electric Co., Ltd., Japan

[21] Appl. No.: 583,704

[22] Filed: Feb. 27, 1984

[30] Foreign Application Priority Data

Feb. 28, 1983 [JP] Japan .............................. 58-27260[U]

[51] Int. Cl.[4] ............................................. G09G 1/00
[52] U.S. Cl. ................................ 340/710; 74/471 XY; 384/215
[58] Field of Search .................... 340/710; 74/471 XY, 74/198; 308/184 R, 184 A, 189 R, 6 R; 384/215, 202, 220

[56]   References Cited
U.S. PATENT DOCUMENTS

| 1,845,430 | 2/1932 | Marti | 384/215 |
| 2,227,971 | 1/1941 | Holm-Hansen | 384/215 |
| 4,404,865 | 9/1983 | Kim | 340/710 |

*Primary Examiner*—Marshall M. Curtis
*Attorney, Agent, or Firm*—Guy W. Shoup

[57]   ABSTRACT

An X-Y input device has: a sphere to be rotated disposed rotatably; a first driven roller in contact with the sphere so as to be rotated by the rotational force thereof; a second driven roller in contact with the sphere so as to be rotated by the rotational force thereof, and disposed so that its axial direction is substantially perpendicular to that of the first driven roller; a first rotation amount detecting means for detecting the rotation amount of the first driven roller; a second rotation amount detecting means for detecting the rotation amount of the second driven roller; and a casing for housing these sphere, first and second driven rollers, and first and second rotation amount detecting means. The casing is constituted by an upper case and a lower case. The lower case has support members for supporting respective bearing members for the first and second driven rollers. Elastically pressing members each having an end which is split into two are projected from the inner surface of the upper case and adapted to press the respective bearing members by their ends. The elastically pressing members may be molded integrally with the upper case. Moreover, the bearing members may be forced to fit into the support members, respectively.

3 Claims, 7 Drawing Figures

X-Y POSITION INPUT DEVICE FOR DISPLAY SYSTEM

BACKGROUND OF THE INVENTION

1. Field of the Invention

The present invention relates to an X-Y input device and more particularly to an X-Y input device suitable for use as a graphic input device for a graphic display unit, for example.

2. Description of the Prior Art

A typical graphic display unit basically comprises a display screen, a display controller, a data channel, various input devices and so forth. One of the input devices employed in the graphic display unit is "Joystick" (registered trademark) arranged such that when a lever supported by a gimbal mechanism is inclined in any desired direction by the operator, the direction and angle of the inclination are detected to generate voltages or digital signals representative of the components in the X- and Y-axis directions, respectively. This input device, however, has a limitation on the pivoting range of the lever and the problem of instability of input signals disadvantageously.

For overcoming these disadvantages, such an input device has been developed in recent years as basically comprising: a sphere to be rotated (referred to as simply "sphere", hereinafter) constituted by a steel ball, for example, and disposed rotatably; a first driven roller in contact with the sphere so as to be rotated by the rotational force thereof; a second driven roller in contact with the sphere so as to be rotated by the rotational force thereof, and disposed so that its axial direction is substantially perpendicular to that of the first driven roller; a first and second rotation amount detecting means constituted by variable resistors or encoders for detecting the rotation amounts of the first and second driven rollers, respectively; and a casing for housing these sphere, first and second driven rollers, and first and second rotation amount detecting means.

The casing has an opening provided in its upper surface for allowing a part of the sphere to project upwardly therethrough. Thus, by holding the casing and rolling the sphere in any desired direction by the hand, the first and second driven rollers are rotated in their respective predetermined directions. The rotational directions and the rotation amounts of these driven rollers are taken out, by the first and second rotation amount detecting means, as voltages or digital signals representative of the components in the X- and Y-axis directions, respectively, and these signals are fed into a display unit.

SUMMARY OF THE INVENTION

It is an object of the invention to provide an X-Y input device having a high reliability.

To this end, according to the invention, there is provided an X-Y input device having: a sphere to be rotated disposed rotatably; a first driven roller in contact with the sphere so as to be rotated by the rotational force thereof; a second driven roller in contact with the sphere so as to be rotated by the rotational force thereof, and disposed so that its axial direction is substantially perpendicular to that of the first driven roller; a first rotation amount detecting means for detecting the rotation amount of the first driven roller; a second rotation amount detecting means for detecting the rotation amount of the second driven roller; and a casing for housing these sphere, first and second driven rollers, and first and second rotation amount detecting means, characterized by comrising: the casing constituted by an upper case and a lower case, which lower case has support members for supporting respective bearing members for the first and second driven rollers; and elastically pressing members each having an end which is split into two, the elastically pressing members being projected from the inner surface of the upper case and adapted to press the respective bearing members by their ends.

The above and other objects, features and advantages of the invention will become clear from the following description of the preferred embodiment taken in conjunction with the accompanying drawings.

BRIEF DESCRIPTION OF THE DRAWINGS

The accompanying drawings in combination illustrate an X-Y input device in accordance with an embodiment of the invention in which.

DESCRIPTION OF THE PREFERRED EMBODIMENT

An embodiment of the invention will be described hereinunder in detail with reference to the accompanying drawings.

Figure 1:
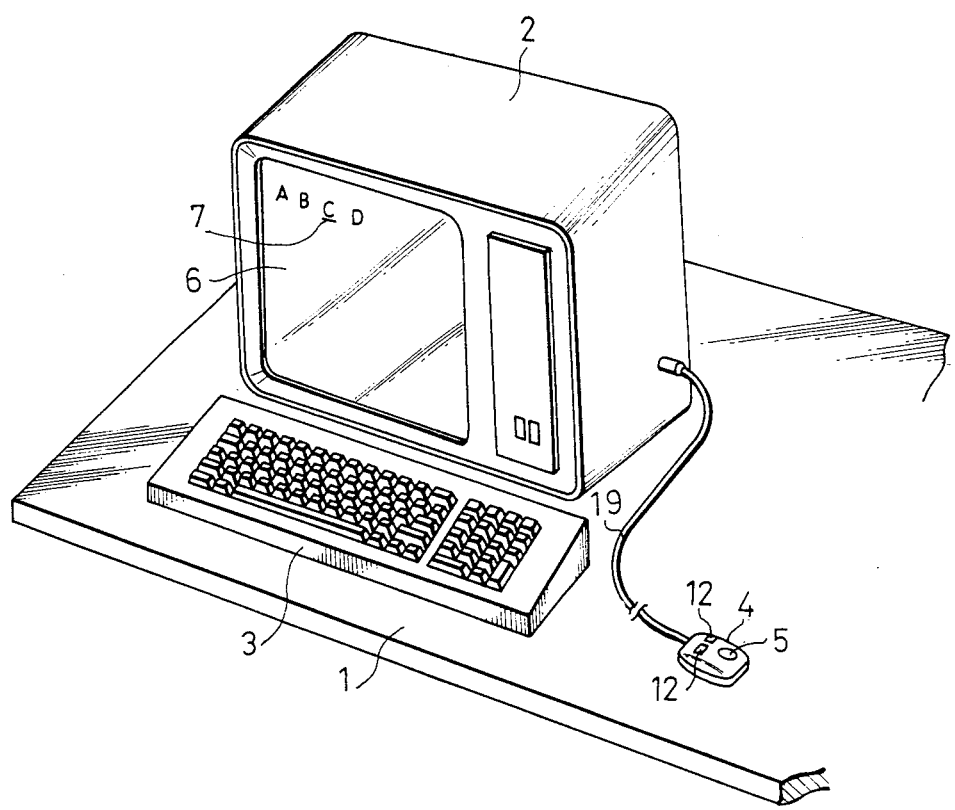
FIG. 1 is a perspective view of a graphic display unit including the input device in accordance with the invention.

FIG. 1 is a perspective view of the whole of a graphic display unit including an X-Y input device in accordance with the embodiment of the invention. On a table 1, there are mounted: a display unit 2 equipped with a screen 6, a controller, a data channel and so forth; an input device 3 having function keys; and an input device 4 in accordance with the embodiment of the invention. It is to be noted that the input device 4 is operated by rotating a sphere 5, described later, by the hand. The input device 4 is, for example, adapted to make it possible to move a cursor 7 displayed on the screen 6 of the display unit 2 to any desired position through the operation thereof.

Figure 2:
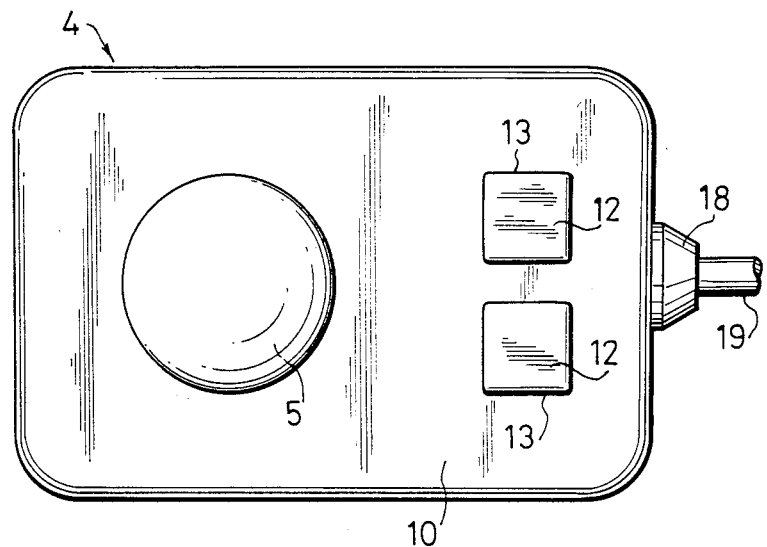
FIG. 2 is a plan view of the input device shown in FIG. 1.
Figure 3:
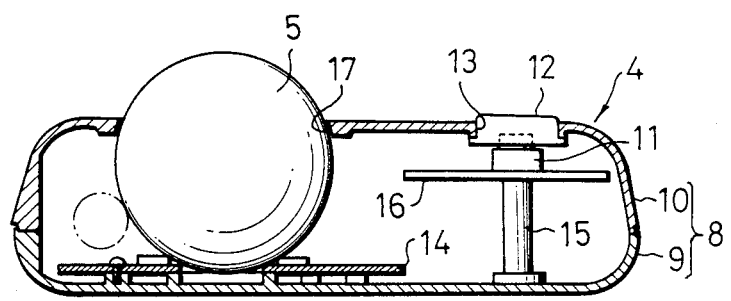
FIG. 3 is a partly-cutaway side elevational view of the input device shown in FIG. 1.
Figure 4:
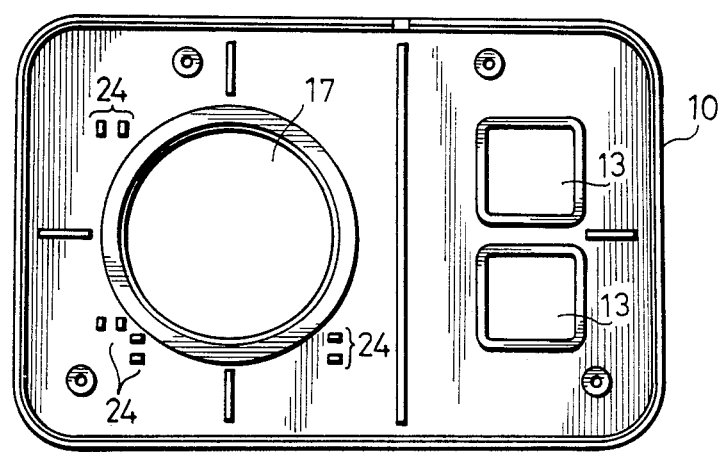
FIG. 4 is a bottom view of the upper case of the input device shown in FIG. 1.

The following is the description of the construction and the operational principle of the input device 4. FIG. 2 is a plan view of the input device 4; FIG. 3 is a partly-cutaway side elevational view of the input device 4; and FIG. 4 is a bottom view of the upper case of the input device 4.

A casing 8 is constituted by a lower case 9 and an upper case 10 which are molded from a rigid synthetic resin. After being fitted to each other, these lower case 9 and upper case 10 are further screwed together so as not to separate from each other.

The upper case 10 is designed to have such a size that the operator can operate the input device 4 while holding the same with one hand. Moreover, a square receiving bore 13 for receiving an operating end 12 of a switch 11 is formed at a predetermined position on the upper wall portion of the upper case 10. The switch 11 is a pushbutton switch, and two or three switches are installed. These switches are employed as switches for the input device 4 itself and moreover, for example, for deleting a portion of the display pattern right above the cursor 7 in the display unit 2 or moving the portion to another display position. The operating end 12 of the switch 11 is slightly projected from the upper case 10.

Figure 5:
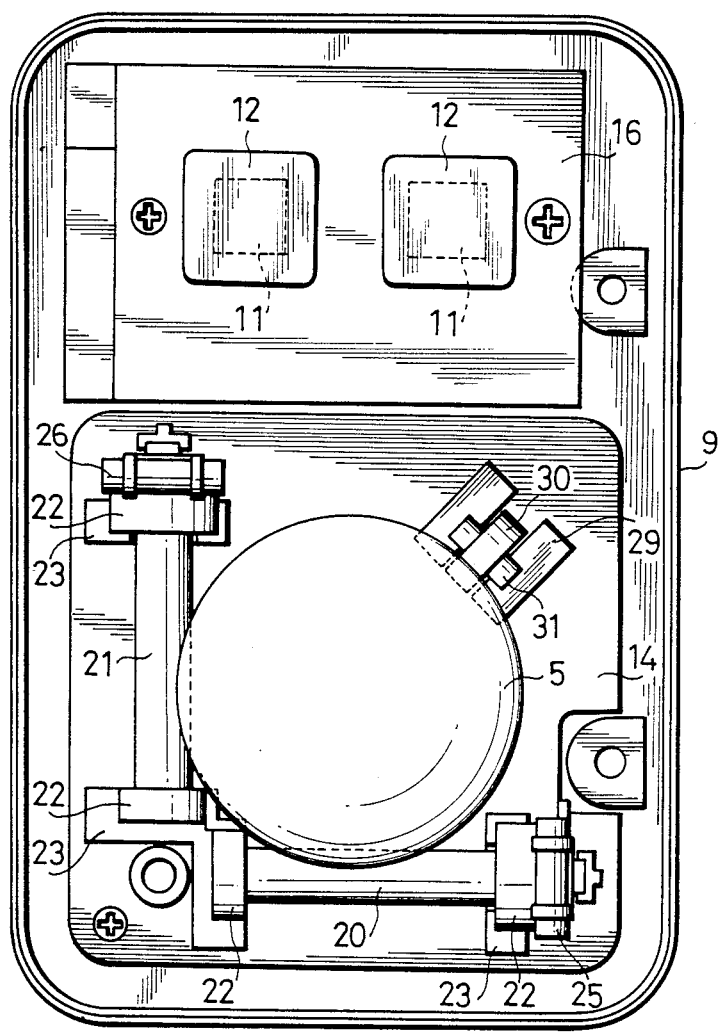
FIG. 5 is a plan view of the lower case, including inner elements, of the input device shown in FIG. 1, with the upper case removed.

Referring now to FIG. 5 which is a plan view of the lower case 9, with the upper case 10 removed therefrom, the operating part of the input device 4 is housed inside the lower case 9. As shown in FIGS. 3 and 5, a mounting plate 14 made of a metal or a rigid sythetic resin is secured to the lower case 9 by means of screws, with a slight space maintained therebetween. The mounting plate 14 is utilized for mounting various elements, as described later, and also serves as a reinforcing member for the lower case 9. Moreover, a plurality of supports 15 are integrally formed with the lower case 9 so as to project upwardly. A printed circuit board 16 having a conductor pattern (not shown) of a predetermined shape is screwed onto these supports 15.

As shown in FIG. 4, the upper case 10 has a circular opening 17 formed at a predetermined position thereof. The upper case 10 and the lower case 9 are secured together by fitting and then securing them to each other by means of screws (not shown) as mentioned hereinbefore. In this case, a rubber bushing 18 is clamped between the lower case 9 and the upper case 10. The bushing 23 is for protecting a signal line 19. One end of the signal line 19 is connected to the printed circuit board 16, while the other end is connected to the input end of the display unit 2 as shown in FIG. 1.

A sphere 5 constituted by a steel ball and having a predetermined weight is disposed on the mounting plate 14. A portion of the sphere 5 is upwardly projected from the opening 17 in the upper case 10 so as to be rollable.

Figure 6:
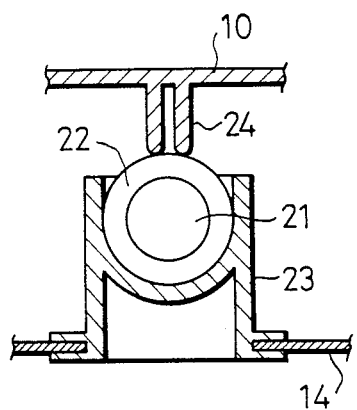
FIG. 6 is an enlarged sectional view showing the relationship between an elastically pressing member and a bearing member in the input device shown in FIG. 1.

As shown in FIG. 5, the spherical surface of the sphere 5 is contacted by a first driven roller 20 and a second driven roller 21. These rollers 20, 21 have their ends rotatably supported by respective bearing members 22 each constituted by a ball bearing or the like. On the other hand, a plurality of support members 23 each constituted by a synthetic resin block are secured to the mounting plate 14. The bearing members 22 are forced to fit into the respective support members 23 from the upper side thereof so as not to come off. However, if a strong upward force is applied to both the rollers 20, 21 and the bearing members 22, there are possibilities that the bearing members 22 may be displaced from the respective support members 23 or fall off therefrom. Therefore, an elastically pressing member 24 is projected from the inner surface of the upper case 10 at the portion corresponding to each of the bearing members 22, and the end of the elastically pressing member 24 is brought into contact with the upper surface of the corresponding bearing member 22 so that the bearing member 22 cannot move upwardly. FIG. 6 is an enlarged sectional view showing the relationship between the elastically pressing member 24 and the bearing member 22. As will be obvious from FIGS. 6 and 4, the elastically pressing member 24 has an end which is split into two so as to be deformable outwardly. Accordingly, if there are some variations in the distances between the upper case 10 and the bearing members 22 due to dimensional errors, the variations can be absorbed by the deformation of the elastically pressing members 24.

Figure 7:
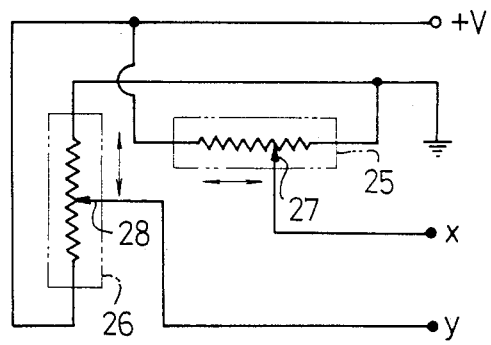
FIG. 7 shows the principle of the operating part of the input device shown in FIG. 1.

As shown in FIG. 5, the first driven roller 20 and the second driven roller 21 are disposed so that their axial directions are perpendicular to each other when the operating part of the input device 4 is viewed in plan. Thus, both the rollers 20, 21 are individually rotated by the rotational force of the sphere 27. The rotational direction and the rotation amount of the first driven roller 20 are detected by a first variable resistor 25 connected thereto. On the other hand, the rotational direction and the rotation amount of the second driven roller 21 are detected by a second variable reistor 26 connected thereto. More specifically, as shown in FIG. 7, the changes in the rotational direction and the rotation amount of the first driven roller 28 appear as the sliding direction and the moving amount of a sliding member 27 of the first variable resistor 25, respectively. Similarly, the changes in the rotational direction and the rotation amount of the second driven roller 21 appear as the sliding direction and the moving amount of a sliding member 28 of the second variable resistor 26, respectively. Accordingly, the rotational state of the sphere 5 can be detected as voltage values of the first variable resistor 25 and the second variable resistor 26 which represent the components in the X- and Y-axis directions, respectively. For this purpose, the variable resistors 25, 26 are required to properly respond to even a small torque.

Another pair of support members 29 are secured to the mounting plate 14. Both ends of a shaft 31 which rotatably supports a roller 30 are forced to fit into the support members 29. The roller 30 is provided in order to reliably effect the power transmission between the sphere 5 and the first driven roller 20 and that between the sphere 5 and the second driven roller 21. Therefore, the elastically urging roller 40 is adapted to be rotatable by means of the rotational force of the sphere 5 and elastically urge the sphere 5 toward both the first driven roller 20 and the second driven roller 21 by means of a spring or the like, although not shown.

It is to be noted that although the rotation amount of each driven roller is detected by employing a variable resistor in the above-described embodiment, an encoder or the like can be employed in place of the variable resistor. Moreover, the support member for supporting each bearing member may be provided on not the mounting plate but the lower case directly.

As has been described, according to the invention, there is provided an X-Y input device having: a sphere to be rotated disposed rotatably; a first driven roller in contact with the sphere so as to be rotated by the rotational force thereof; a second driven roller in contact with the sphere so as to be rotated by the rotational force thereof, and disposed so that its axial direction is substantially perpendicular to that of the first driven roller; a first rotation amount detecting means for detecting the rotation amount of the first driven roller; a second rotation amount detecting means for detecting the rotation amount of the second driven roller; and a casing for housing these sphere, first and second driven rollers, and first and second rotation amount detecting means, characterized by comprising: the casing constituted by an upper case and a lower case, which lower case has support members for supporting respective bearing members for the first and second driven rollers; and elastically pressing members each having an end which is split into two, the elastically pressing members being projected from the inner surface of the upper case and adapted to press the respective bearing members by their ends. Therefore, by means of the elastically pressing members, the bearing members for the driven rollers can be prevented from being displaced or falling off from the respective support members. In addition, since each elastically pressing member has an end which is split into two so as to be deformable, if there are some variations in the distances between the upper case and the bearing members due to dimensional errors, the variations can be absorbed. Accordingly, it is possible to provide an X-Y input device having a high reliability.

Although the invention has been described through specific terms, it is to be noted here that the described embodiment is not exclusive and various changes and modifications may be imparted thereto without departing from the scope of the invention which is limited solely by the appended claims.

What is claimed is:
1. An X-Y input device having:
a sphere to be rotated disposed rotatably;
a first driven roller in contact with said sphere so as to be rotated by the rotational force thereof;
a second driven roller in contact with said sphere so as to be rotated by the rotational force thereof, and disposed so that its axial direction is substantially perpendicular to that of said first driven roller;
a first rotation amount detecting means for detecting the rotation amount of said first driven roller;
a second rotation amount detecting means for detecting the rotation amount of said second driven roller; and
a casing for housing the sphere, first and second driven rollers, and first and second rotation amount detecting means;
characterized by comprising:
said casing constituted by an upper case and a lower case, which lower case has support members for supporting respective bearing members for said first and second driven rollers; and
elastically pressing members each having an end which is resilient and is split into two to form two arm portions each having a free end, said elastically pressing members being projected from the inner surface of said upper case and adapted to press the top surface of respective bearing members by their said free ends wherein slight upward displacement of the bearing members is accommodated by the spreading of said arms away from each other and the inward spring action of said arm portions tends to force the bearings into the respective said support member.

2. An X-Y input device according to claim 1, wherein said elastically pressing members are molded integrally with said upper case.

3. An X-Y input device according to claim 1, wherein said bearing members are forced to fit into said support members, respectively.

* * * * *